United States Patent [19]

Takimoto

[11] 4,368,490
[45] Jan. 11, 1983

[54] CAMERA

[75] Inventor: Hiroyuki Takimoto, Yokohama, Japan

[73] Assignee: Canon Kabushiki Kaisha, Tokyo, Japan

[21] Appl. No.: 204,877

[22] Filed: Nov. 7, 1980

[30] Foreign Application Priority Data

Nov. 15, 1979 [JP] Japan .................................. 54/148617
Nov. 15, 1979 [JP] Japan .................................. 54/148618

[51] Int. Cl.³ .......................... H04N 5/30; H04N 5/76
[52] U.S. Cl. ..................................... 358/217; 358/310; 358/335; 455/117
[58] Field of Search .................... 358/217, 127, 4, 186; 360/35, 33, 132, 84, 85; 455/117, 127

[56] References Cited

U.S. PATENT DOCUMENTS 2,840,693 6/1958 Strauss .................................. 455/117
3,984,625 10/1976 Camras .................................. 358/4

Primary Examiner—Richard Murray
Attorney, Agent, or Firm—Fitzpatrick, Cella, Harper & Scinto

[57] ABSTRACT

A camera has an image pick-up device for taking out image signals, and a setting circuit having a first setting mode for bringing the image pick-up device into a non-excited state, a second setting mode for bringing the image pick-up device into a first excited state, and a third setting mode for bringing the image pick-up device into a second excited state and making it possible to take out the image signals from the image pick-up device.

25 Claims, 20 Drawing Figures

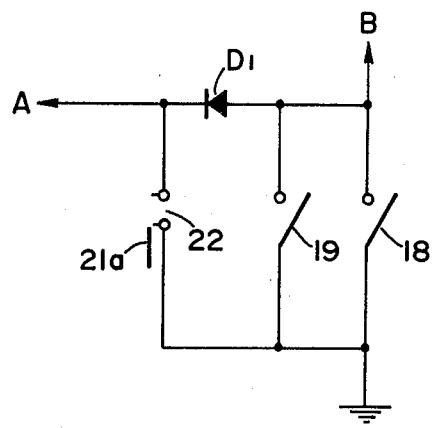
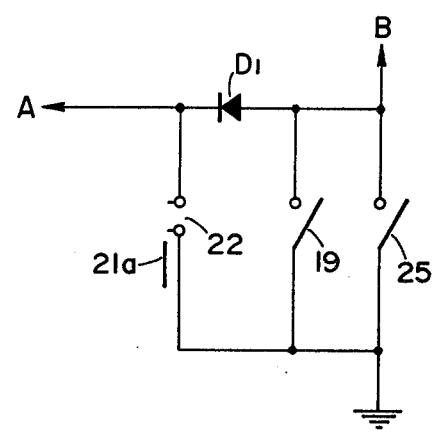
FIG. 5  FIG. 6
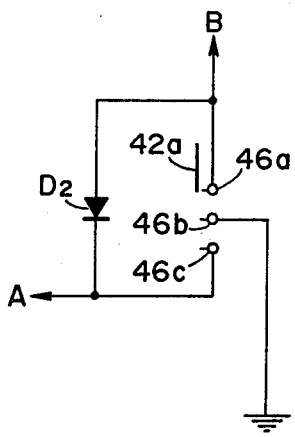
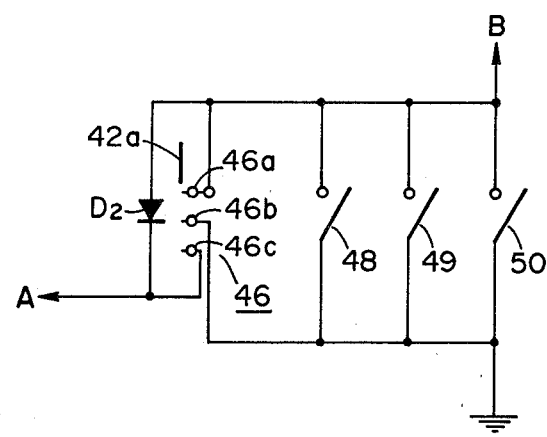
FIG. 7  FIG. 8

CAMERA

BACKGROUND OF THE INVENTION

1. Field of the Invention

This invention relates to a camera which produces image signals.

2. Description of the Prior Art

In a camera which generates image signals (a so-called video camera), it has heretofore been commonly practised to use an image pick-up tube as image signal generating means and to use a picture tube as image signal monitor means (finder). Both of the image pick-up tube and the picture tube are operated by emission of thermal electrons from the cathodes thereof and therefore, a considerably long time, for example, of the order of ten seconds, has been required for the respective cathodes to reach a predetermined operating temperature. Accordingly, in the case of photographing, if the heating of the cathodes is started by a heater, the photographing speed is lost and for this reason, it has heretofore been practised in the image recording preparatory condition to set the cathodes of the image pick-up tube and the picture tube to their heated condition by setting the image recording button of a video tape recorder for recording image signals connected to the camera by a cord. This has led to a great power consumption in the image recording preparatory condition which in turn has led to a difficulty in respect of the service life of the battery in the camera video tape recorder system loaded with a battery.

Also, in the conventional camera of this type, a finder provided only by such an optical member as is used in 8 mm cameras, instead of a picture tube, is sometimes used as the means for confirming the photographic view field, for the purpose of reducing the cost of the camera. In such case, as compared with the case where the conventional picture tube is used, the confirmation of whether or not the image pick-up tube has reached its normal operative condition cannot completely be effected and this has given rise to a danger that image recording is effected by mistake even when the picture signal output level is not proper. Particularly, as described above, mcuh time is required for the cathodes to reach their normal operating temperature when photography is started and therefore, particularly in a case where a fast photographing speed is required, it has often happened that improper image recording is effected.

Further, the image recording has heretofore been accomplished by converting an image into an electrical signal by an image pick-up tube and causing a recording apparatus to record the image signal.

As such image pick-up tube, as is well-known, means such as vidicon, planvicon, silicon vidicon, calnicon, saticon, newvicon, etc., have been developed and improved along with the technical advance and nowadays, for domestic use and public welfare, such means are being endowed with a performace sufficiently satisfactory in resolving power and color reproducibility. However, the image pick-up tube has a disadvantage that a picture signal is not generated in five to ten seconds after power has been applied thereto, namely, until the heater of the image pick-up tube is sufficiently heated. Accordingly, where an electronic finder is used as the finder, namely, where the output of the image pick-up tube is applied to the picture tube to visualize the image, if the image is obtained while the photographer is looking into the electronic finder, the image recording can be started by camera trigger. However, in a camera of the optical finder type, an optical image is obtained in the finder independently of the temperature of the heater of the image pick-up tube and this leads to a disadvantage that before the heater of the image pick-up tube is sufficiently heated, the camera is triggered to start the image recording and when the video tape (hereinafter referred to as the tape) is played back, it is found that no image has been recorded thereon for five to ten seconds. The camera of the optical finder type, as compared with the camera of the electronic finder type, has the above-described disadvantage, but it has merits such as light weight, low cost, compactness, small consumed power, etc., and it is best suited for the outdoor image recording using a battery.

SUMMARY OF THE INVENTION

It is an object of the present invention to provide a camera improved in the above-described points.

It is another object of the present invention to provide a camera generating image signals which can reduce the consumed current without reducing the photographing speed.

It is still another object of the present invention to provide a camera effecting the image recording in which a current lower in magnitude than the normal operating current is in advance supplied to an image pick-up tube and a picture tube to pre-heat the cathode portions thereof and can momentarily reach the normal level when the normal operating current is applied, thereby reducing the consumed current without reducing the photographing speed.

It is yet still another object of the present invention to provide a camera in which photographing preparation stage detecting means is provided and the above-described pre-heated condition is set in the image pick-up tube and/or picture tube by the output of the detecting means (for example, a switch for detecting the cocked position of a camera grip, a switch for detecting the position of the grip held by the photographer, a switch for detecting the position of the camera set on a tripod, a camera trigger switch having a camera monitor step switch stage, etc.), thereby reducing the consumed current without reducing the photographing speed when the photographing is started.

It is a further object of the present invention to provide a camera which incorporates therein a malfunction preventing device for preventing the image recording from being effected until the picture signal output level of the image pick-up tube reaches a proper level, when the image recording is about to be effected before said output level reaches the proper level.

It is a further object of the present invention to provide a camera in which means for detecting that the image pick-up tube is in its normal operative condition (for example, means for detecting the temperature condition of the cathode portion, means for detecting the electrical resistance of the heater of the cathode, means for detecting the time of power supply to the cathode and the quantity of power supplied thereto, means for detecting the picture signal output level of the image pick-up tube, etc.) is provided and even if camera release is effected, the output of the detecting means is discriminated to cause the start of image recording to temporally stand by until the image pick-up tube reaches its normal condition.

It is a further object of the present invention to provide a camera which annunciates to the operator whether or not image pick-up means producing picture (image) signals is suited for the image recording.

It is a further object of the present invention to provide a camera in which where the picture signal from the image pick-up tube is not generated at a point of time whereat camera trigger has been effected, the image recording is not started and this is annunciated to the photographer.

It is a further object of the present invention to provide a camera which, when camera trigger has been effected, annunciates the propriety or impropriety of the image recording by the lapse of time after the trigger has been effected.

BRIEF DESCRIPTION OF THE DRAWINGS

Other objects of the present invention will become more fully apparent from the following detailed description of some embodiments of the invention taken is conjunction with the accompanying drawings, in which:

FIG. 5 is a schematic circuit diagram of the detecting means shown in FIG. 1;

FIG. 6 is a schematic circuit diagram of the detecting means shown in FIG. 2;

FIG. 7 is a schematic circuit diagram of the detecting means shown in FIG. 3;

FIG. 8 is a schematic circuit diagram of the detecting means shown in FIG. 4;

DESCRIPTION OF THE PREFERRED EMBODIMENTS

Figure 1:
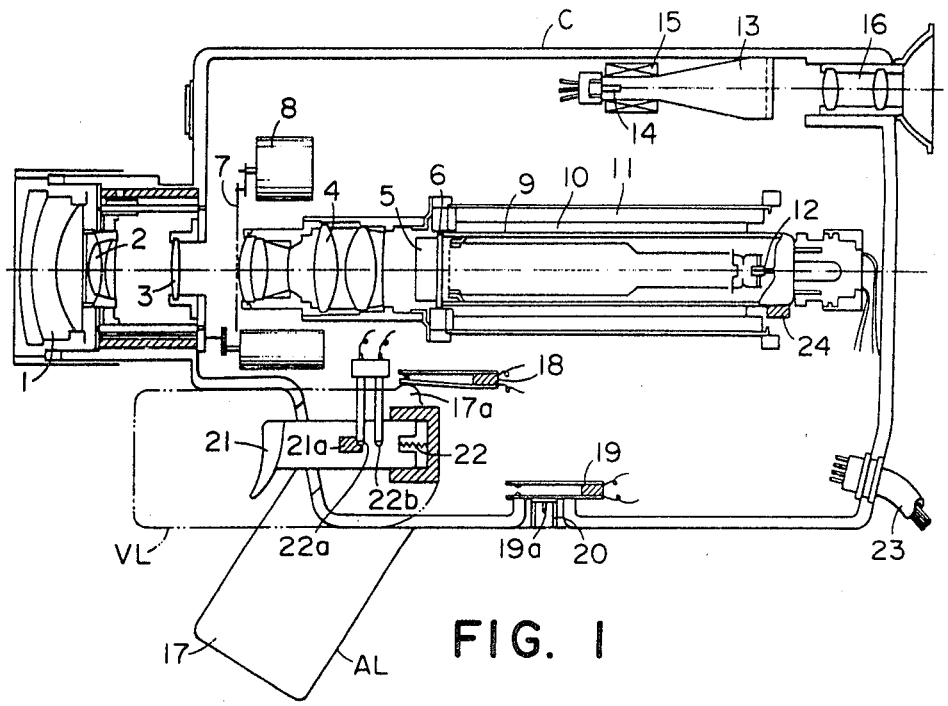
FIG. 1 is a cross-sectional side view of the interior of the camera according to an embodiment of the present invention.

Referring to FIG. 1 which is a side view of the interior of the camera illustrating an embodiment of the present invention, it includes a focusing lens 1, a variable magnification lens 2, a correction lens 3, a relay lens 4, an optical low-pass filter 5, a stripe filter 6 and a diaphragm 7 controlled by a meter 8. The object light passes through the focusing lens 1, the variable magnification lens 2, the correction lens 3, the relay lens 4, the optical low-pass filter 5, the stripe filter 6 and the diaphragm 7 to the photoelectric surface of an image pick-up tube 9.

The object image having impinged on the photoelectric surface of the image pick-up tube 9 is converted into an electrical image signal by the scanning of the electron beam from a cathode 12 controlled by a focus coil 10 and a polarization coil 11.

Designated by 13 is a picture tube playing the role of the finder of means for confirming the view field. By a known technique, not shown, it controls the image signal of the image pick-up tube 9 and electrons discharged from the cathode 14 thereof with the aid of a polarization coil, forms the object image on the fluorescent surface thereof and makes the object image visually confirmable by an eye-piece 16.

Denoted by 17 is a grip which is cockable between a position indicated by phantom line VL and a position indicated by solid line AL. Designated by 18 is a grip cocking detecting switch. When the grip 17 has been cocked by a projection 17a on the grip 17, the projection 17a bears against the detecting switch 18, which thus produces an ON signal. Reference numeral 19 designates a tripod set condition detecting switch. When a tripod, not shown, is set with the male screw thereof inserted into a tripod hole 20 which is a female threaded hole, a projection 19a integral with the switch 19 presses the switch 19 by the entry of the tripod and thus, the switch 19 produces an ON signal. Denoted by 21 is a release button (Trigger button) projected outwardly of the camera and biased leftwardly by a spring 22. When the release button 21 is depressed rightwardly, a contact piece 21a integral with the released button 21 comes into contact with the contact pieces 22a, 22b of a switch 22, which thus produces an ON signal. When the depression force is released, the contact piece 21a assumes its OFF condition and returns to its initial position.

Designated by 23 is a cable for delivering the image signal or judgment signal produced by the camera C. The cable 23 is connected to a recording apparatus for recording the image signal. The recording apparatus may be, for example, a video tape recorder (VTR).

The switches 18, 19 and 22 shown in FIG. 1 are connected in the manner as shown in FIG. 5. The switches 18, 19 and 22 are parallel-connected and a diode D1 is inserted between the switches 19 and 22.

Figure 9:
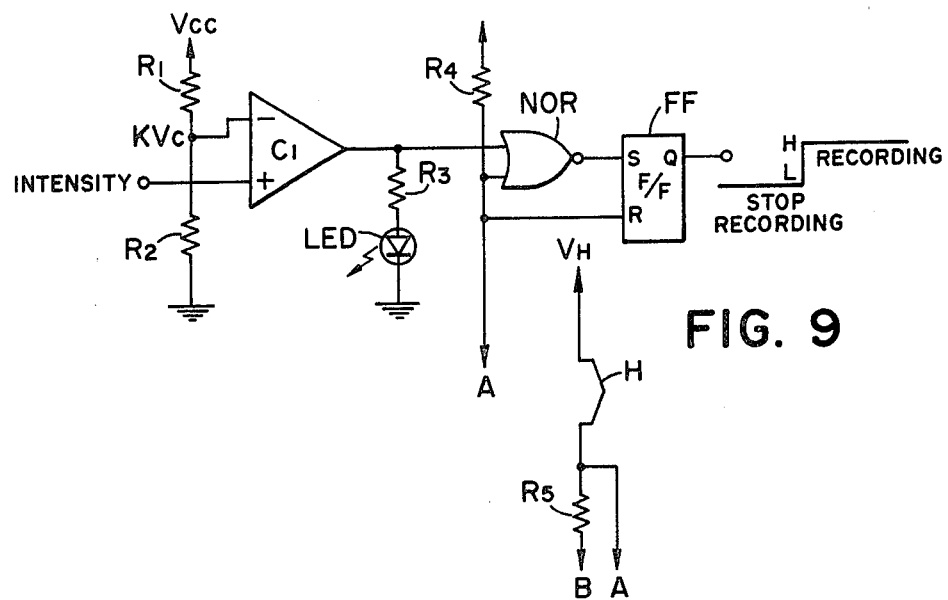
FIG. 9 is a control circuit diagram.

FIG. 9 shows a control circuit controlled by the above-described switches. By said switches, the preheating for the image pick-up tube is effected and the recording of the image signals provided from the image pick-up tube is effected. In FIG. 9, R1 and R2 are resistors, the resistance values of which are determined so that an image (picture) intensity signal reference voltage KVC is obtained at the junction between the resistors R1 and R2.

Designated by C1 is a comparator which discriminates whether or not the output of the image pick-up tube 9 is producing such a degree of signal that can effect image recording. In this comparator, the reference voltage set by the resistors R1, R2 and the image intensity signal voltage are compared with each other. If the output of the image pick-up tube 9 can be intactly used, the image intensity signal is directly applied to the comparator C1, and if the output of the image pick-up tube 9 cannot intactly be used, the image intensity signal is amplified by an amplifier and the output of the amplifier is applied to the comparator C1. When the image intensity signal voltage is lower than the reference voltage KVC, namely, when the environment is light, the comparator C1 puts out a low voltage, i.e. a low level signal, and when the image intensity signal voltage is higher than the reference voltage KVC, namely, when the environment is dark, the comparator C1 puts out a high voltage, i.e. a high level signal.

LED designates a light-emitting diode of informing means, and it is connected to the comparator C1 to indicate that the image intensity signal voltage is not sufficient. The light-emitting diode LED effects said indication by the output of the comparator C1. A resistor R3 is for preventing an overcurrent from flowing to the light-emitting diode LED.

Designated by NOR is a gate which realizes a logic $\overline{\alpha + \beta}$ for inputs $\alpha$ and $\beta$. The gate NOR receives as input the output of the comparator C1 and an ON-OFF low level signal L and high level signal H obtained from A of a switch circuit shown in FIG. 5, and develops signal $\overline{\alpha + \beta}$.

FF designates a flip-flop whose output Q is set by a positive-going of the gate NOR and is reset by a positive-going, namely, an ON to OFF transition, of the switch circuit. When the output of the flip-flop FF is at low level, the image recording is stopped and, when the output of the flip-flop FF is at high level, the image recording is effected.

All of the above-described circuits may be contained within the camera C so that the output Q of the flip-flop FF is supplied to the recording apparatus. Alternatively, the above-described circuits may be contained within the recording apparatus so that the image intensity signal is transmitted to the recording apparatus. The light-emitting diode LED may be provided in one or more of the finder of the camera C, the surface of the camera C and the recording apparatus. Design may also be made such that the output of the comparator C1 is applied to the image receiving tube 13.

Now, when the grip 17 of the camera C is cocked and the switch 18 is closed, a low level (potential 0) signal is applied from B of FIG. 5 to B of FIG. 9, and a power set by a resistor R5 begins to be applied to a heater H.

The resistor R5 is for rendering the image pick-up tube 13 into pre-heated condition, and the pre-heated condition is provided by applying such a degree of current that an image signal can be quickly obtained when a further power has been applied to the heater to take out the image signal from the image pick-up tube 13. For example, if the operative condition is 1, the resistor R5 is set so that a current of about ⅓ flows during the pre-heated condition.

Also, when a tripod (not shown) is mounted, the pre-heated condition is brought about as previously described.

After the above-described pre-heated condition, when the release button 21 is depressed and the switch 22 is closed, the terminal A of FIG. 5 puts out a low level (potential 0) signal and, as shown in FIG. 9, a greater current is supplied to the heater H. Also, a low level signal is applied to one end of the gate NOR.

Figure 13:
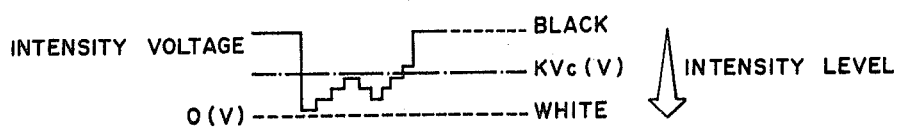
FIG. 13 is a signal waveform diagram useful in understanding the operation of the control circuit of FIG. 9.

Now, assume that the heater of the image pick-up tube 9 is sufficiently heated and that the waveform of the image intensity signal as shown in FIG. 13, for example, is applied to the plus side input of the comparator C1. A reference voltage KVc ($0 < K < 1$) obtained by dividing a voltage Vcc by the resistors R1 and R2 is applied to the minus side input of the comparator C1. At this time, the output of the comparator C1 assumes a pulse waveform which repeats H/L in accordance with the intensity signal. That is, when the intensity signal is higher than KVc[V], a high level signal is put out and, when the intensity signal is lower than KVc, a low level signal is put out. When the switch 22 is in its OFF position, one of the inputs of the gate NOR connected to the output of the switch 22 is brought to high level by a resistor R4 and accordingly, the output of the gate NOR, namely, the S input of the flip-flop FF, is at low level, the R input thereof is at high level and the Q output thereof is at low level. Accordingly, the recording apparatus is in a condition in which the image recording has been stopped. Here, assume that the camera trigger has been effected by the release button and the switch 22 has been closed. At this time, the R input becomes low level and one input of the gate NOR to which the switch is connected also becomes low level. H/L is being repeated at the other input of the gate NOR and therefore, when both the two inputs of the gate NOR become their low level, the output of the gate NOR becomes its high level. Accordingly, the S input of the flip-flop FF is at high level and the R input thereof is at low level and therefore, the Q output thereof is set to high level and the recording apparatus can start the image recording by the high level output of the flip-flop FF. Once the Q output of the flip-flop FF becomes high level, the Q output is never inverted even if the S input thereof repeats high level and low level, unless the switch is opened and the R input becomes high level. That is, the recording apparatus continues the image recording until the camera trigger is released.

Figure 14:
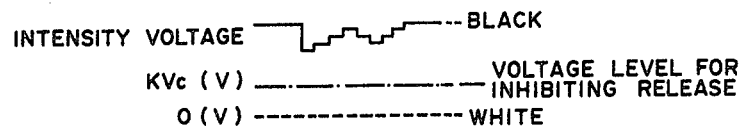
FIG. 14 is a signal waveform diagram useful in understanding the operation of the control circuit shown in FIG. 9.

Next, assume that in a condition in which the heater of the image pick-up tube has not been sufficiently heated, and in spite of the object being sufficiently light, the intensity signal does not reach a certain level, for example, the waveform of the image intensity signal as shown in FIG. 14 is being applied to the plus side input of the comparator C1.

At this time, the output of the comparator C1 always assumes high level. Even if, at this time, the release by the camera trigger is effected and the R input of the flip-flop FF becomes low level, the output of the gate NOR, namely, the S input of the flip-flop FF, remains at low level because the output of the comparator C1 is at high level. Accordingly, the Q output does not become high level and the recording apparatus does not start the image recording in spite of the camera trigger being effected. That is, the image recording is inhibited. When the heater of the image pick-up tube soon becomes sufficiently heated and the intensity signal as shown in FIG. 13 becomes produced, the output of the gate NOR assumes high level H and the recording apparatus starts the image recording, as already described.

In a condition in which the image recording is not started even if the camera trigger is effected, namely, in a condition in which the intensity signal has not reached a predetermined level, and when the output of the comparator C1 is at high level, the light-emitting diode LED is turned on. Accordingly, the photographer can know that the image recording has not been started in spite of the camera trigger being effected. Since it is usually the case that the photographer effects the camera trigger while looking into the finder, the light-emitting diode LED for indicating the release inhibition (image recording inhibition), namely, the intensity signal level deficiency, may preferably be disposed within the finder. In the case of a camera which permits remote photography, the light-emitting diode LED may be disposed on a side surface of the camera C or on the recording apparatus, or of course, light-emitting diodes may be disposed parallel to each other.

When the heater of the image pick-up tube has been sufficiently heated and the recording apparatus is already in the image recording condition, it sometimes happens that the object brightness itself is low and the level of the intensity signal is not sufficient.

At such time, the output of the comparator C1 continues to assume high level and the light-emitting diode LED remains turned on. As already described, once the image recording is started, the image recording does not stop even if the light-emitting diode LED is turned on, unless the camera trigger is released, and the photographer, by seeing the turn-on of the light-emitting diode LED during this image recording, can know that the object is too dark. A camera is usually provided with an automatic exposure circuit so that the aperture is controlled so as to automatically provide a proper exposure in accordance with the object brightness and therefore, where the object brightness is still in under-exposure condition even if the aperture is placed in fully open condition, the photographer does not become aware that the picture plane is too dark and he has made a failure, until the picture photographed is reproduced. For this reason, some cameras are provided with means for displaying the warning of high and low exposures, and the above-described light-emitting diode LED serves also as such display means.

Figure 20:
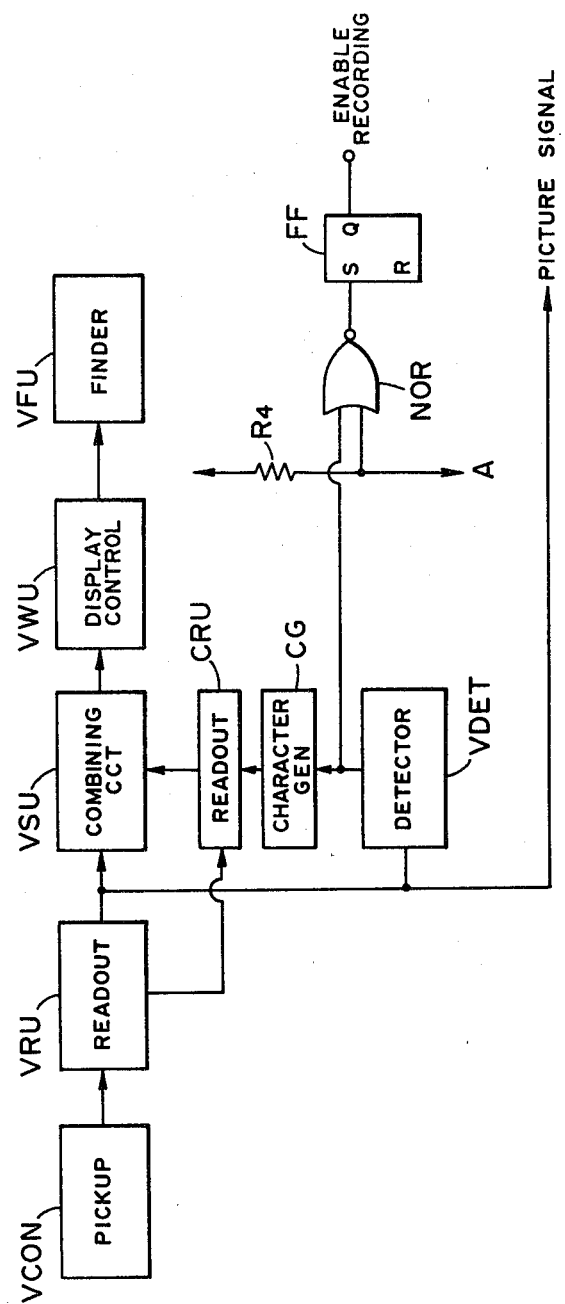
FIG. 20 is a schematic block diagram showing still another embodiment of the present invention.

FIG. 20 shows another example of the warning circuit for effecting the above-described warning after the start of the image recording. VCON designates the image pick-up tube 13 (FIG. 1), and VRU denotes a read-out circuit for reading out the picture output of the image pick-up tube VCON. VDET denotes a detector circuit for detecting the picture output level. The detector circuit VDET produces a high level signal when the picture signal is not an output sufficient for the image recording to be effected, and puts out a low level signal in the contrary case. CG designates a character generator which puts out a message indicative of warning by the high level signal of the detector circuit VDET. CRU designates a read-out circuit which reads out the output of the character generator CG by the read-out timing signal of the read-out circuit VRU and puts out a message in order to adjust its own read-out timing to the read-out timing of the read-out circuit VRU. VSU denotes a combining circuit for combining the outputs of the read-out circuits VRU and CRU and putting out the combined output. VWU designates a display control circuit which effects the control of the supply of the picture signal to a cathode ray tube VFU used as an electronic finder and causes the picture to be reproduced by the cathode ray tube VFU. Accordingly, the message indicative of under-exposure can be displayed by the cathode ray tube VFU. NOR denotes a gate, and FF designates a flip-flop. When operated, such circuit puts out an enable recording signal as previously described. By the enable recording signal, the picture signal is sent to the recording apparatus, not shown. Due to the above-described construction, no message is sent to the recording apparatus even if under-exposure takes place during the image recording.

Figure 2:
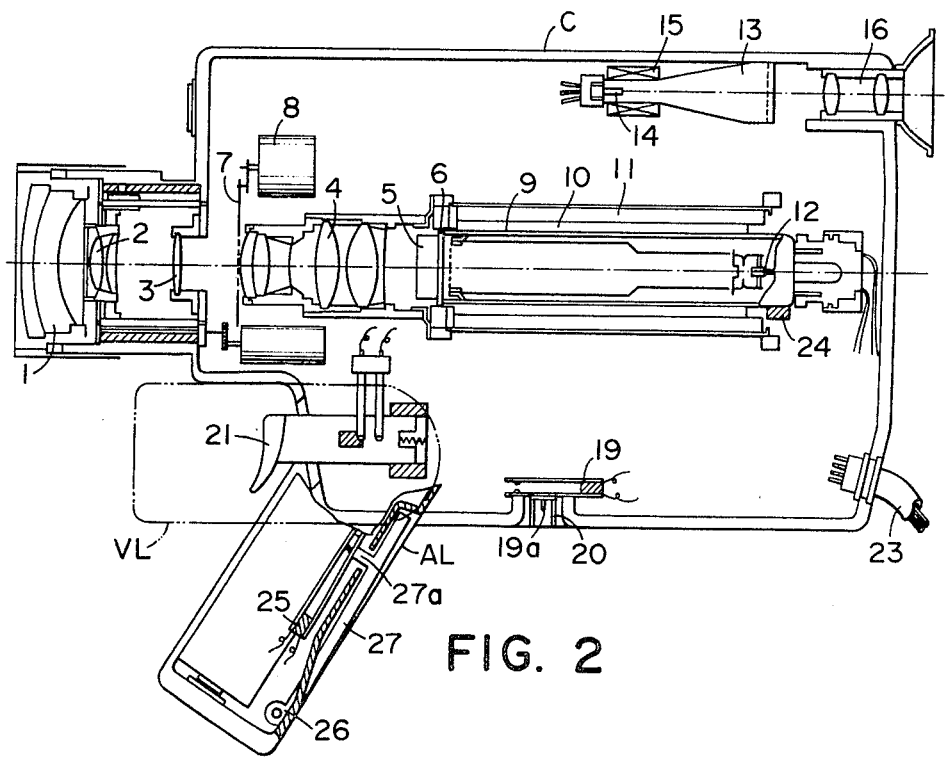
FIG. 2 is a cross-sectional side view of the interior of the camera according to another embodiment of the present invention.

FIG. 2 is a cross-sectional view of the interior of the camera illustrating another embodiment of the present invention.

In FIG. 2, members identical to those shown in FIG. 1 are given identical reference characters and the major points of this embodiment will be particularly described. In this embodiment, means for detecting grip hold is provided instead of the grip cocking detecting switch of the previous embodiment and is combined with the aforementioned switches to provide an instruction of image recording preparatory condition.

Designated by 25 is a grip hold detecting switch adapted to be closed and opened by the projection 27a of a lever 27 pivotally supported on a shaft 26 provided on the grip 17. That is, when the grip 17 has been grasped by the operator, the lever 27 is urged into the grip and the switch 25 is changed over from its OFF position to its ON position by the projection 27a.

FIG. 6 shows a circuit diagram of the switches 19, 22 and 25 in the above-described embodiment. As shown there, the switches are parallel-connected and one end is grounded while the other end is connected to a portion indicated by the same reference character in FIG. 9.

With the above-described construction, when the grip 17 of the camera C has been grasped, the grip hold is detected by the switch 25 and, as previously described, a heater power smaller than usual is supplied to the heater of the image pick-up tube 9, whereupon the pre-heating starts. Accordingly, when the release button 21 has been operated, the point A assumes zero potential and the heater H is supplied with a power three times as great as that during the pre-heating, and the recording apparatus can quickly receive a proper image signal from the camera C and record it. Of course, in this embodiment, when a tripod is used, the image pick-up tube is also prebiased and the cathode is heated, as previously described.

Figure 3:
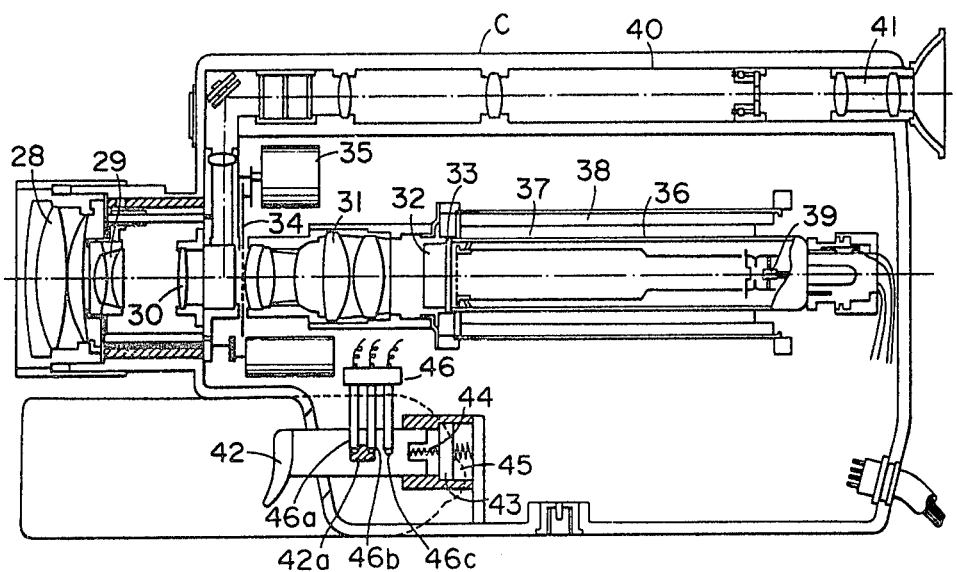
FIG. 3 is a cross-sectional side view of the interior of the camera according to still another embodiment of the present invention.

FIG. 3 is a side view of the interior of the camera illustrating still another embodiment of the present invention. It includes a focusing lens 28, a variable magnification lens 29, a correction lens 30, a relay lens 31, an optical low-pass filter 32, a stripe filter 33, and a diaphragm 34 controlled by a meter 35. The object light passes through the focusing lens 28, the variable magnification lens 29, the correction lens 30, the relay lens 31, the optical low-pass filter 32, the stripe filter 33 and the diaphragm 34 to the photoelectric surface of an image pick-up tube 36. The object light having impinged on the photoelectric surface of the image pick-up tube 36 is converted into an electrical image signal by the scanning of the electron beam from a cathode 39 controlled by a focus coil 37 and a polarization coil 38.

Designated by 40 is an optical finder for confirming the view field, and it makes visual confirmation possible by an eye-piece 41.

Denoted by 42 is a release button (trigger button) projected outwardly of the camera and leftwardly biased by a first spring 44 and a second spring 45 through an intervening member 43. The spring pressure of the second spring is made greater than that of the first spring so that the pressure force is greater after the right end face of the first spring 44 bears against the intervening member 43 than before a first position in which the right end face of the first spring 44 bears against the intervening member 43. In the first position, the contact pieces 46a, 46b of a switch 46 contact a contact piece 42a integral with the release button 42, thus producing a first ON signal. Before the release button 42 is further biased rightwardly from the first position and the spring 45 is fully compressed, the contact piece 46a comes out of contact with the contact piece 42a and now, contact pieces 46b, 46c come into contact with the contact piece 42a and produce a second ON signal in a second position of the release button 42. By providing a clear difference between the pressure force till the first position and the pressure force till the second position, as described above, it is possible to make the photographer recognize that the first stage is the image recording preparatory condition. In the present embodiment, the pre-heating of the image pick-up tube is effected in the first stage.

FIG. 7 shows a circuit diagram of the switch 46 shown in FIG. 3. In FIG. 7, D2 designates a diode, and the aforementioned contact pieces 42a, 46a, 46b and 46c are connected as shown. In FIG. 7, A and B show the connection relations with FIG. 9. Accordingly, when the release button 42 is first depressed and the contact pieces 46a, 46b are short-circuited by the contact piece 42a, a prebias is applied to the heater of the image pick-up tube 36 to start the pre-heating and the cathode begins to be heated. When the release button 42 is depressed and soon thereafter the release button 42 is further depressed, the contact piece 42a short-circuits the contact pieces 46b, 46c. Accordingly, a further power is applied to the heater M as previously described and quickly sets the flip-flop FF while overlapping with the intensity signal of the image pick-up tube 36, and an image recording start signal is put out to the recording apparatus.

Figure 4:
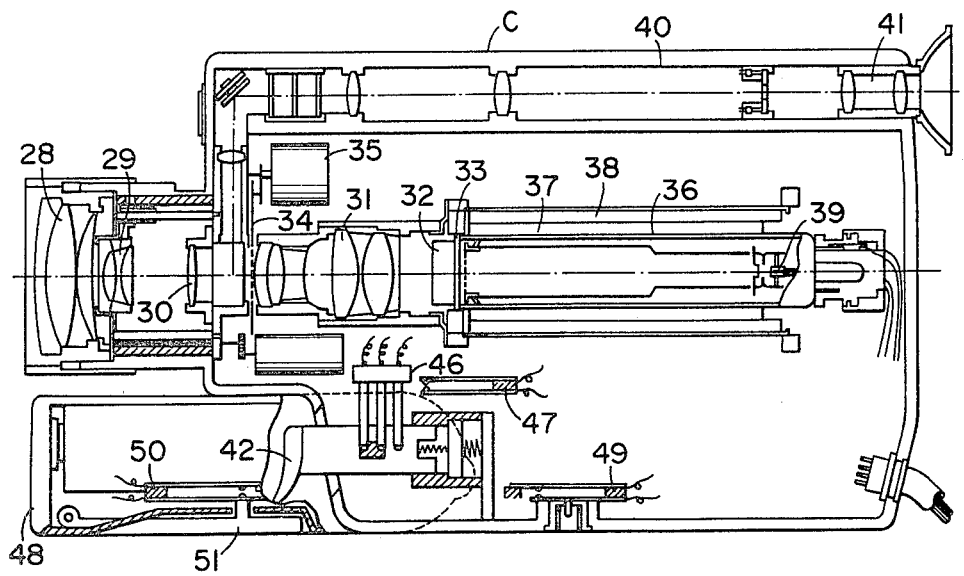
FIG. 4 is a cross-sectional side view of the interior of the camera according to yet still another embodiment of the present invention.

FIG. 4 is a side view of the interior of the camera according to another embodiment of the present invention. In this embodiment, the cocking of the grip, the holding of the grip, the mounting of the tripod, etc. are included as the means for imparting the prebias of the image pick-up tube in the embodiment of FIG. 3. In FIG. 4, members identical to those shown in FIG. 3 are given identical reference characters.

In FIG. 4, reference numeral 47 designates a switch for detecting the cocking of the grip 48. When the grip is cocked, the switch 47 is closed.

Designated by 49 is a switch for detecting the mounting of the tripod. The switch 49 is constructed so that it is closed by a projected portion 49A formed on the switch 49 when the tripod has been inserted.

Denoted by 50 is a switch for detecting the grip hold. When a lever 51 provided on the grip is depressed by the hand of the operator, the switch 50 is closed by a projected portion 51a formed on the lever 51.

FIG. 8 is a circuit diagram showing the connection of the aforementioned switches. The switches 46, 48, 49 and 50 are parallel-connected, and A and B of FIG. 8 are connected to A and B of FIG. 9. When the contact pieces 46a, 46b of the switch 46 or the switches 48, 49, 50 are closed, a power is supplied to the heater of the image pick-up tube 36 through a resistor R5, thus starting the pre-heating. Thereafter, when the release button 42 closes the contact pieces 46b, 46c of the switch 46, the power supplied to the heater H is increased and the image pick-up tube 36 quickly puts out an intensity signal and the gate NOR sets the Q output of the flip-flop FF to high level with the intensity signal overlapping with the ON signal by the contact pieces 46b, 46c of the switch 46, and sends an image recording start signal to the recording apparatus.

Figure 10:
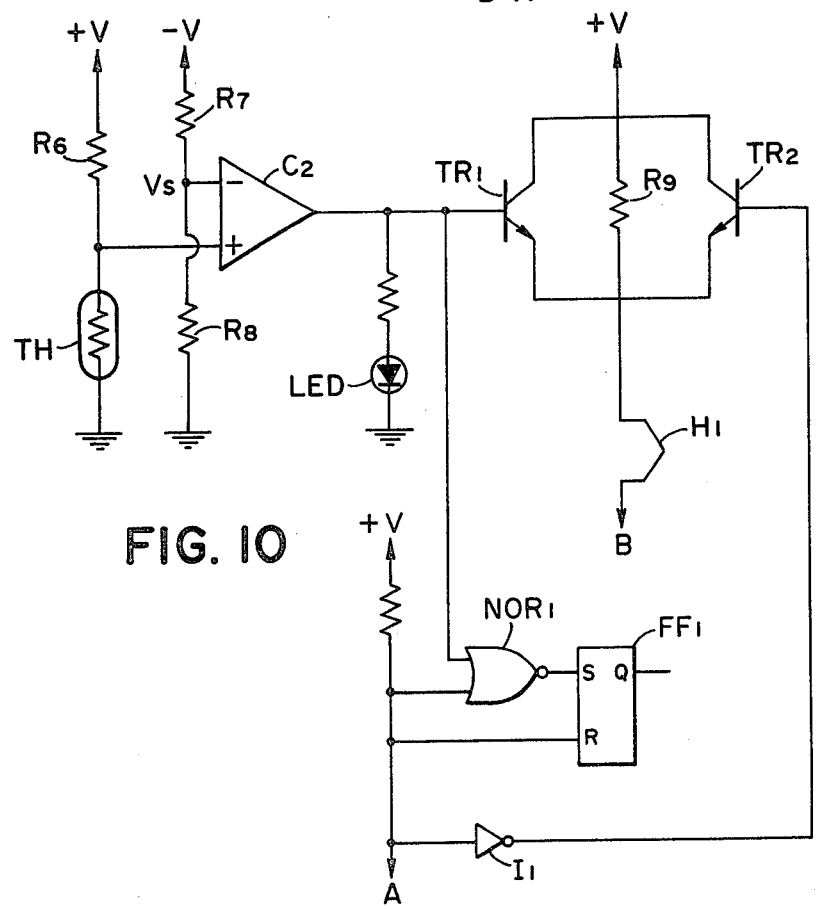
FIG. 10 is a schematic diagram of another control circuit different from that shown in FIG. 9.

FIG. 10 is a circuit diagram showing another embodiment of the discriminating circuit shown in FIG. 9.

In FIG. 10, TH designates a thermistor which is a means for detecting temperature. Such thermistor TH is disposed near the image pick-up tube, particularly near the cathode heater thereby to know the pre-heated condition of the image pick-up tube. The pre-heated temperature of the image pick-up tube is discriminated by the resistance value of the thermistor, and such value is converted into the form of a voltage by the resistance values of a resistor R6 and the thermistor TH.

The voltage appearing across the thermistor TH when the pre-heated temperature has been reached is set as a reference value Vs by resistors R7 and R8, and a comparator C2 discriminates whether or not the voltage drop of the thermistor TH has become the reference value Vs. Since the voltage drop of the thermistor TH is great when the image pick-up tube is cold, the comparator C2 puts out a high level signal and informs by a light-emitting diode LED1 that the image pick-up tube is not at the set pre-heated condition. When the image pick-up tube becomes warm, the resistance value of the thermistor TH becomes lower and therefore, the comparator C2 puts out a low level signal to turn off the light-emitting diode LED1. Thus, the operator can know that the pre-heated condition set by the light-emitting diode LED1 has been reached.

When the comparator C2 is putting out a high level signal, a transistor TR1 is in its ON state and therefore, the heater H1 of the image pick-up tube is first supplied with a great power through the transistor TR1. When the heater H1 of the image pick-up tube becomes warmed up to the set pre-heated temperature, the thermistor TH detects it and, as previously mentioned, the output of the comparator C2 assumes low level and the heater H1 is supplied with a prebias power through a resistor R9. Now, if a low level signal is obtained from A by the operation of the switches of FIGS. 5–8, a gate NOR1 puts out a high level signal and the output Q of a flip-flop FF1 assumes high level and thus, an image recording start signal is put out.

Also, the signal of A turns on a transistor TR2 to permit a sufficient power to be supplied to the heater H1 and therefore, the image pick-up tube quickly puts out an image signal.

When the force applied to the release button is removed, the signal of A assumes high level and flip-flop FF1 is reset and the transistor TR2 is turned off, whereupon the aforementioned preparatory condition is brought about.

In such embodiment, whether or not the image pick-up tube is putting out an image signal is not discriminated, but it is a premise that the image pick-up tube has become ready to quickly put out an image signal by the transistor TR2. Again in this embodiment, design may be made such that the operating temperature at which the image signal is put out is detected, and a function like that of the light-emitting diode LED1 in the previous embodiment may be added.

Figures 11, 12:
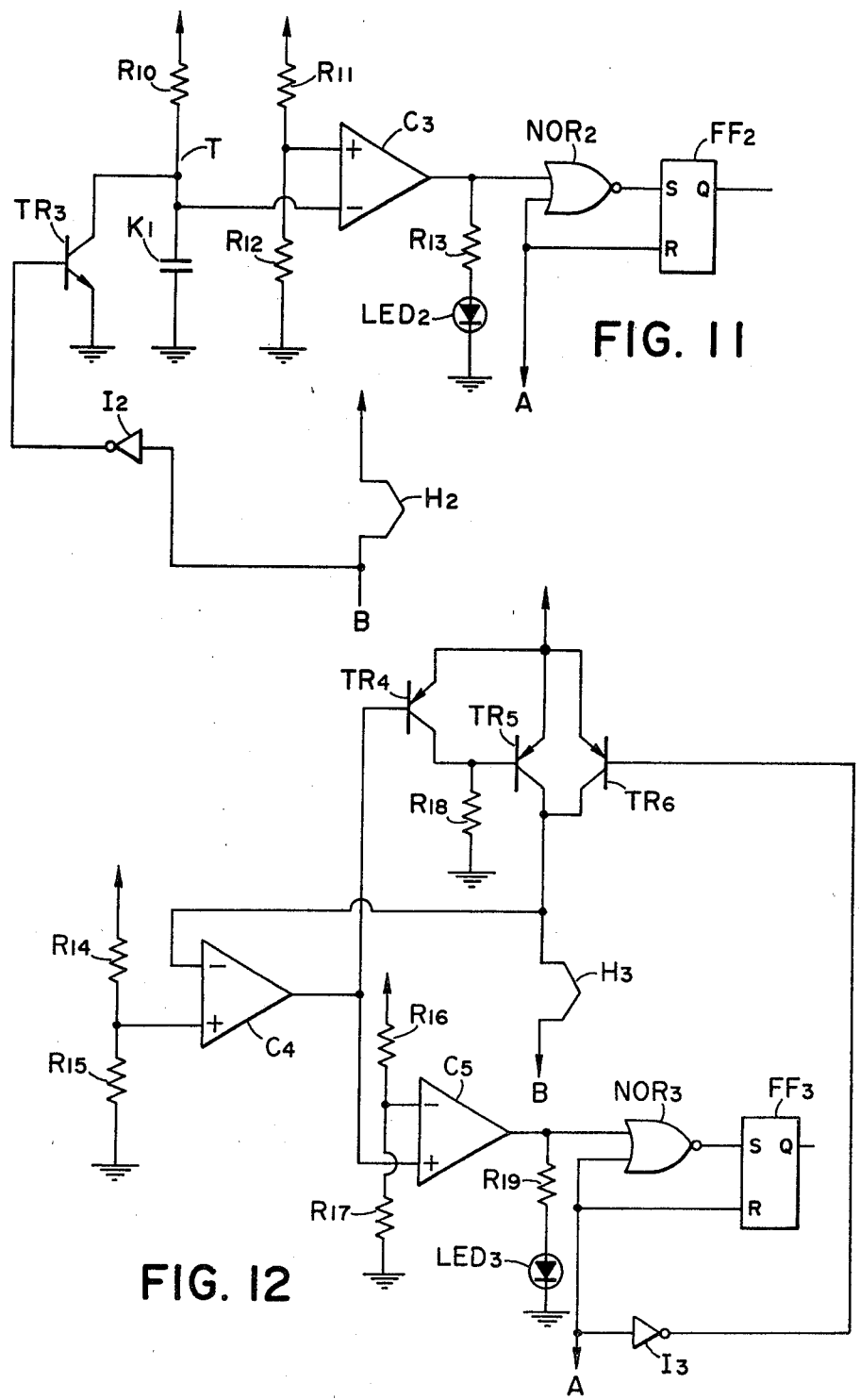
FIG. 11 is a schematic diagram of still another control circuit different from that shown in FIG. 9.
FIG. 12 is a schematic diagram of yet still another control circuit different from that shown in FIG. 9.

FIG. 11 shows another embodiment of the circuit shown in FIG. 9. In this embodiment, whether or not the image pick-up tube has put out a sufficient image signal is discriminated by measuring the time from after the heater begins to be supplied with power. For example, when the switch provided by the release button shown in FIGS. 5 and 6 has been closed earlier, the heater H1 of the image pick-up tube is supplied with power upon closing of the switch and the closing of the switch is transmitted through an inverter I2, and a transistor TR3 is turned off and a timer T is operated. By the turn-off of the transistor TR3, the charging of a capacitor K1 is effected through a resistor R10, and the time until the image pick-up tube puts out a sufficient image signal is discriminated by the charging time of the timer T stored in the capacitor K1, and that time is put out in the form of a voltage from the timer T. Resistors R11 and R12 are for setting a voltage representing the time until the image pick-up tube puts out the image signal, and by a comparator C3, the output of the timer T is compared with a reference value determined by the resistors R11 and R12. When a predetermined has passed from the power supply to the heater, the comparator C3 puts out low level and, during the other time, the comparator C3 puts out high level. Accordingly, the operator can know, by a light-emitting diode LED2, whether or not the image pick-up tube has become fully operative. If the comparator C3 puts out low level, a gate NOR2 puts out a high level signal by the low level signal applied from A and sets the output Q of a flip-flop FF2 to high level, thus putting out an image recording start signal. If the force applied to the release button is removed, the switch is opened and the signals of A and B become high level and the power supply to the heater H1 is cut off while, at the same time, the flip-flop is reset and the capacitor K1 is cleared.

FIG. 12 is a circuit diagram showing another embodiment of the circuit shown in FIG. 9. In this embodiment, a constant current is caused to flow to the heater H2 in order to create a pre-heated condition which permits the image pickup tube to quickly shift to its operative condition, and discrimination is effected by a voltage appearing in the heater H2. When the potential of B shown in FIGS. 5-8 becomes 0, a comparator C4 for discriminating the voltage of the heater H2 puts out a high level signal to turn off a transistor TR4. Accordingly, a constant current is supplied to the heater H2 from a constant current circuit comprising a transistor TR5 and a resistor R18. When the voltage of the heater H2 becomes greater, the comparator C4 puts out a low level signal to turn on the transistor TR4 and turn off the transistor TR5. Accordingly, the power supply to the heater is cut off, but the voltage of the heater H2 has become a predetermined value by that time because a sufficient pre-heated condition to operate the image pick-up tube is set in the form of voltage by resistors R14 and R15.

A comparator C5 receives the signal of the comparator C4 as input and discriminates the output of the comparator C4 with a reference voltage value set by resistors R16, R17 as the reference, and if the image pick-up tube has not reached its set operative voltage at which it can sufficiently put out an image signal, the comparator C5 puts out a high level signal to turn on a light-emitting diode LED3 and, if the image pick-up tube is in its operative condition, the comparator C5 puts out a low level signal and applies the low level signal to a gate NOR3. If a 0-potential signal, namely, a low level signal, comes from A of FIGS. 5-8, the gate NOR3 puts out a high level signal and renders the output Q of a flip-flop FF3 to high level. By such output of the flip-flop FF3, the operator can know whether or not the image recording is possible. The transistor TR5 of the above-described constant current circuit supplies a current necessary for the pre-heating. When the potential of A has become low level, a transistor TR6 is turned on and the heater H2 receives the supply of such a degree of power that the image pick-up tube can sufficiently put out a sufficient image signal.

According to the present invention, as has been described above, means for applying a power necessary for the pre-heating is provided in the image pick-up means to quickly obtain a sufficient image signal, whereby when the camera has been triggered, a sufficient image signal for the image recording can be derived from the camera.

Figure 15:
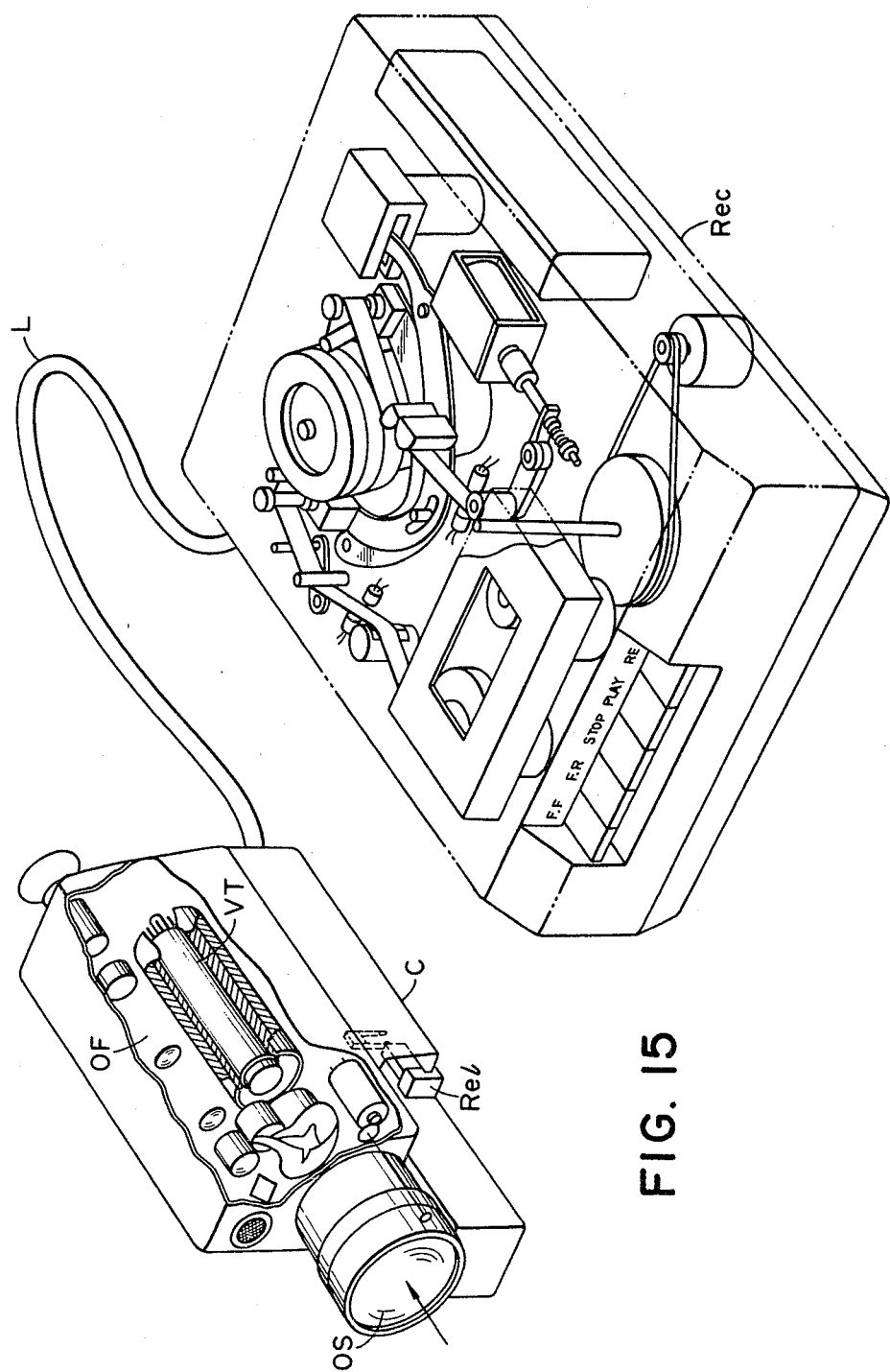
FIG. 15 illustrates an embodiment of the present invention.

FIG. 15 is a perspective view illustrating an embodiment of the present invention.

Designated by C is the camera unit of the image recording apparatus. The image of an object is converted into electrical signals by an image pick-up tube VT through an optical lens system OS.

Denoted by OF is a finder which comprises an optical finder, and it confirms the picture view field which has entered the camera through the optical lens system OS.

Re1 designates a release (camera trigger which supplies a power to the heater of the image pick-up tube VT and effects the start of image recording.

Rec denotes a recording apparatus for recording images, and it records, for example, on a magnetic tape, the electrical signals into which the image of the object has been converted by the image pick-up tube VT of the camera unit C.

Figure 16:
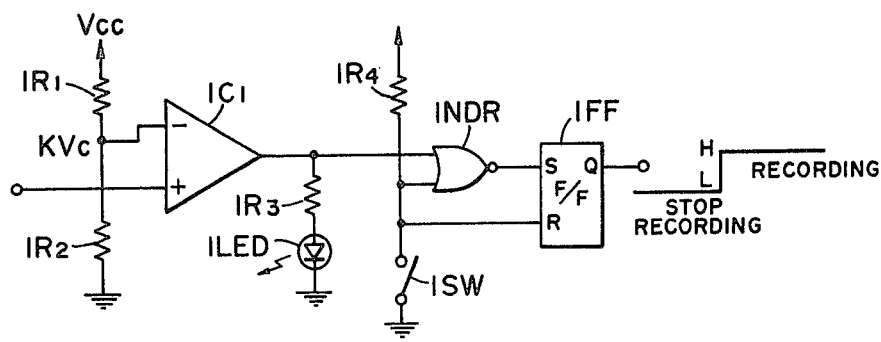
FIG. 16 is a schematic block diagram of the image recording apparatus according to the present invention.

FIG. 16 is a circuit diagram showing an embodiment of the present invention. In FIG. 16, 1R1 and 1R2 designate resistors, the resistance values of which are determined so as to obtain a reference voltage KVc of image intensity signal at the junction between the resistors 1R1 and 1R2.

1C1 designates a comparator which judges whether or not the output of the image pick-up tube VT is putting out such a degree of signal that enables the image recording to be accomplished. This comparator compares the image intensity signal voltage with the reference voltage set by the resistors 1R1 and 1R2. As regards the image intensity signal, if the output of the image pick-up tube VT can be intactly used, it is intactly applied to the comparator 1C1 and, if the output of the image pick-up tube VT cannot be intactly used, it is once amplified by an amplifier and the output of the amplifier is applied to the comparator 1C1. The comparator 1C1 puts out a low voltage, i.e. a low level signal when the image intensity signal voltage is lower than the reference voltage KVc, namely, when the environment is light, and puts out a high voltage, i.e. a high level signal when the image intensity signal voltage is higher than the reference voltage KVc, namely, when the environment is dark.

Designated be 1LED is a light-emitting diode which is connected to the comparator 1C1 to display that the image intensity signal voltage is not sufficient. The light-emitting diode 1LED effects said display by the output of the comparator 1C1. A resistor 1R3 is for preventing an overcurrent from flowing to the light-emitting diode 1LED.

Denoted by 1SW is a switch adapted to be closed and opened in response to the release Re1 of the camera C shown in FIG. 15. The image recording is started upon closing of the switch 1SW, and is stopped upon opening of the switch 1SW. The switch 1SW is connected to a resistor 1R4, and the closing and opening of the switch 1SW are put out as electrical signals of low level and high level.

Designated by 1NOR is a gate which realizes a logic operation $\overline{A+B}$ for inputs A and B. The gate 1NOR receives as input the output of the comparator 1C1 and the low level signal and the high level signal representing the closing and opening of the switch 1SW, and develops a signal $\overline{A+B}$.

Denoted by 1FF is a flip-flop whose output Q is set by a positive-going of the gate 1NOR and reset by a positive-going, i.e. an ON to OFF transition, of the switch 1SW. When the output of the flip-flop 1FF is at low level, the image recording is stopped and, when the output of the flip-flop 1FF is at high level, the image recording is effected.

All of the above-described circuits may be contained within the camera C and design may also be made such that the output Q of the flip-flop 1FF is sent to the recording apparatus Rec. Alternatively, said circuits may be contained within the magnetic recording apparatus Rec and the image density signal may be transmitted to the recording apparatus Rec. The light-emitting diode 1LED may also be provided in one or more of the finder of the camera C and the recording apparatus Rec of the camera C.

Now, assume that the heater of the image pick-up tube is supplied with power by unshown means and is sufficiently heated and that, as shown in FIG. 16, for example, the waveform of the image intensity signal is applied to the plus side input of the comparator 1C1. A reference voltage KVc (0<K<1) obtained by dividing a voltage Vcc by the resistors 1R1 and 1R2 is applied to the minus side input of the comparator 1C1. At this time, the output of the comparator 1C1 assumes a pulse waveform which repeats H/L in accordance with the intensity signal. That is, when the intensity signal is higher than KVc[V], a high level signal is put out and, when the intensity signal is lower than KVc, a low level signal is put out. When the switch 1SW is in its OFF position, one of the inputs of the gate 1NOR connected to the switch 1SW is caused to assume high level by a resistor 1R4 and accordingly, the output of the gate 1NOR, namely, the S input of the flip-flop 1FF, is at low level and the R input thereof is at high level while the Q output thereof is at low level. Thus, the recording apparatus Rec is in image recording stop condition. Here, assume that camera trigger has been effected by the release Re1 and that the switch 1SW has been closed. At this time, the R input is at low level and one input of the gate 1NOR to which the switch 1SW is connected is also at low level. The other input of the gate 1NOR is repeating H/L and therefore, when both the two inputs of the gate 1NOR assume low level, the output of the gate 1NOR assumes high level. Accordingly, the S input of the flip-flop 1FF is at high level and the R input thereof is at low level and so, the Q output thereof is set to high level and the recording apparatus Rec starts the image recording. Once the Q output of the flip-flop 1FF assumes high level, the Q output is never inverted even if the S input repeats high level and low level, unless the switch 1SW is opened and the R input assumes high level. That is, the recording apparatus Rec continues the image recording until the camera trigger is released.

Figure 18:
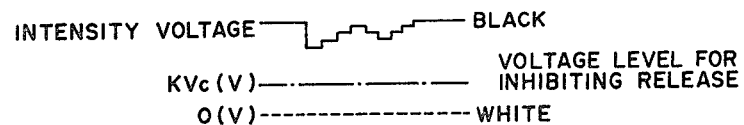

Next, assume that in a condition in which the heater of the image pick-up tube VT is not sufficiently heated by unshown means, in spite of the object being sufficiently light, the intensity signal does not reach a certain level, for example, the waveform of the image intensity signal as shown in FIG. 18 is applied to the plus side input of the comparator 1C1. At this time, the output of the comparator 1C1 is always at high level. Even if, at this time, the camera trigger is released and the R input of the flip-flop 1FF assumes low level, the output of the gate 1NOR, namely, the S input of the flip-flop 1FF, remains a low level because the output of the comparator 1C1 is at high level.

Accordingly, the Q output does not assume high level and the recording apparatus Rec does not start the image recording in spite of the camera trigger being effected.

Figure 17:
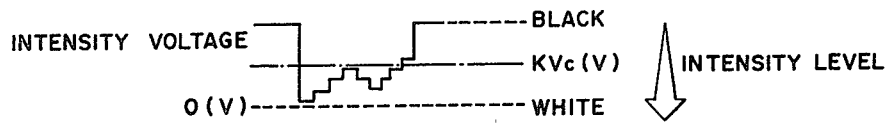
FIGS. 17 and 18 illustrate the embodiment shown in FIG. 16.

When the heater of the image pick-up tube VT soon becomes sufficiently heated and the intensity signal as shown in FIG. 17 is produced, the output of the gate 1NOR assumes high level and the recording apparatus Rec starts the image recording, as already described.

When the output of the comparator 1C1 is at high level in a condition in which the image recording is not started even if the camera trigger is effected, namely, a condition in which the intensity signal does not reach a predetermined level, the light-emitting diode 1LED is turned on. Accordingly, the photographer can know that the image recording has not been started in spite of the camera trigger being effected. It is usually the case that the photographer effects camera trigger while looking into the finder and therefore, the light-emitting diode 1LED displaying such release inhibition (image recording inhibition), namely, the level deficiency of the intensity signal, should preferably be disposed within the finder. In the case of a camera which permits remote photography, the light-emitting diode may be disposed on a side surface of the camera C or on the recording apparatus Rec and of course, light-emitting diodes may be disposed parallel to each other.

When the heater of the image pick-up tube VT has been sufficiently heated and the recording apparatus Rec is already in the image recording condition, it sometimes happens that the object brightness itself is low and the level of the intensity signal is not sufficient. At such time, the output of the comparator 1C1 continues to assume high level and the light-emitting diode 1LED remains turned on. As already described, once the image recording is started, the image recording does not stop even if the light-emitting diode 1LED is turned on, unless the camera trigger is released, and the photographer, by seeing this turn-on of the light-emitting diode 1LED during the image recording, can know that the object is too dark. A camera is usually provided with an automatic exposure circuit so that the aperture is controlled so as to automatically provide a proper exposure in accordance with the object brightness and therefore, where the object brightness is still in underexposure condition even if the aperture is placed in fully open condition, the photographer does not become aware that the picture plane is too dark and he has made a failure, until the picture photographed is reproduced. For this reason, some cameras are provided with means for displaying the warning of high and low exposures, and the above-described light-emitting diode 1LED serves also as such display means.

Figure 19:
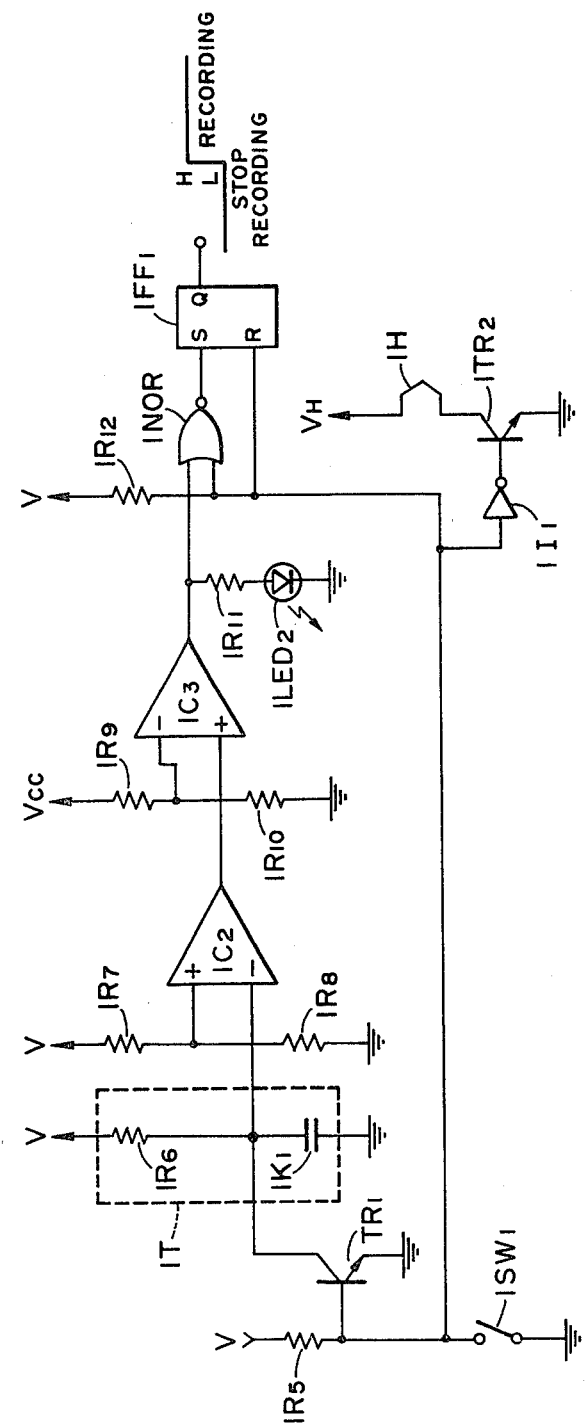
FIG. 19 is a schematic block diagram showing another embodiment of the present invention.

FIG. 19 is a circuit diagram showing another embodiment different from the embodiment shown in FIG. 16.

In this embodiment, another signal is applied to the positive terminal to which the picture (image) intensity signal of the comparator 1C1 of the previous embodiment has been applied.

In FIG. 19, reference character 1SW1 designates a switch adapted to be closed and opened in response to camera released Re1, in the same manner as that previously described. Of course, the closing of this switch designates the start of the image recording, and the opening of this switch designates the stoppage of the image recording. The switch 1SW1 is connected to a resistor 1R5 so that the closing and opening of the switch 1SW1 provide the low level and high level of electrical signal.

Designated by 1TR1 is a transistor which is a switching element adapted to be turned off by the closing of the switch 1SW1 and to be turned on by the opening of the switch 1SW1.

A resistor 1R6 and a capacitor 1K1 together constitute a timer 1T which is usually reset by the turn-on of the transistr 1TR1. The time of such timer is determined by the operative condition of the heater of the image pick-up tube VT.

Resistors 1R7 and 1R8 set the reference value for discriminating the output of the timer 1T.

Designated by 1C2 is a comparator which identifies the output of the timer 1T by the reference value determined by the resistors 1R7 and 1R8 and which puts out a low level signal when the timer 1T puts out a predetermined output, and which puts out a high level signal when the output of the timer 1T does not reach the predetermined level. The low level signal of such comparator 1C2 is an enable image recording signal, and the high level signal thereof is an image recording preparatory signal.

The values of resistors 1R9 and 1R10 are set so as to discriminate between the high level and the low level signal of the comparator 1C2.

Designated by 1C3 is a comparator which receives as input the reference value obtained by the resistors 1R9 and 1R10 in order to identify the output of the comparator 1C2 and discriminates the signal of the comparator 1C2.

Denoted by 1LED is a light-emitting diode which, by the output of the comparator 1C3, informs of whether the image recording is possible or prepared. Of course, other display element may be used as the light-emitting element. A resistor 1R11 is for preventing an overcurrent from flowing to the light-emitting diode.

Designated by 1NOR is a gate which develops an output A+B for inputs A and B. Such gate 1NOR receives as inputs the output of the comparator 1C3 and the signal of the switch 1SW1, and provides a high level output when both of the two inputs becomes low level.

Denoted by 1FF1 is a flip-flop whose output Q is set to high level by the high level of the output of the gate 1NOR and whose output Q is reset to low level by the low→high level signal of the switch 1SW1.

Reference indication 1I1 designates an inverter for inverting the signal produced by the switch 1SW1 and applying it to a transistor 1TR2.

Designated by 1H is the heater of the image pick-up tube VT which is supplied with power upon turn-on of the transistor 1TR2.

The operation of the embodiment having the above-described construction will now be described.

Now, when the camera C is turned to an object and the release Re1 is depressed, the switch 1SW1 changes over from its OFF position to its ON position. Upon closing of the switch 1SW1, the transistor 1TR2 is turned on by the inverter 1I and supplies power to the heater 1H of the image pick-up tube VT. The closing of the switch 1SW1 turns off the transistor 1TR1 and operates the timer 1T. Accordingly, a capacitor 1K1 starts to be charged and the potential at one terminal of the comparator 1C2 begins to rise with time.

When the heater 1H becomes sufficiently warm and a sufficient time to discharge thermal electrons elapses, the output of the timer 1T exceeds the reference value determined by resistors 1R7 and 1R8 and reduces the output of the comparator 1C2 from high level to low level. When the comparator 1C2 is putting out a high level output, the comparator 1C3 puts out a high level output and turns on the light-emitting diode 1LED, and the gate 1NOR puts out a low level signal by the high level output of the comparator 1C3 and therefore, the flip-flop 1FF puts out a low level signal meaning the image recording preparation.

When the timer 1T is actuated and a predetermined time elapses, the output voltage of the timer 1T exceeds the reference value and the output of the comparator 1C2 becomes low level.

Accordingly, the comparator 1C3 puts out a low level signal and turns off the light-emitting diode 1LED, and the gate 1NOR puts out a high level signal overlapping with the low level signal produced by the closing of the switch 1SW1, and sets the flip-flop 1FF1. By the high level of the flip-flop 1FF1, the image signals are sent to the recording apparatus Rec, which thus records the image signals on a magnetic tape.

When the release Re1 is returned to its original condition, the content of the capacitor 1K1 is discharged by the transistor 1TR1 and the power supply to the heater 1H is cut off.

When the release has been operated in the above-described manner, the photographer is informed of the image recording preparatory condition.

The above-described circuit is disposed in a manner similar to that described with respect to the previous embodiment.

According to the present invention, as has been described above in detail, where the level of the intensity signal at the point of time whereat the camera trigger has been effected is low, a failure of image recording is prevented without starting the image recording operation of the recording apparatus and the photographer is informed of that and, during the image recording, it serves also as a warning of the low brightness of the object and the photographer is informed of the expected fault of the recorded image and thus, failures of the image recording can be completely eliminated. This may indeed be said to be a great effect.

We claim:

1. A camera having excitable image pick-up means to output image signals, and setting means for controlling said pick-up means, said setting means having a first setting mode for bringing said image pick-up means into a non-excited state, a second setting mode for bringing said image pick-up means into a first excited state, wherein said setting means has means for detecting cocking of a grip of the camera and bringing about said second setting mode, and a third setting mode for bringing said image pick-up means into a second excited state and making it possible to output said image signals from said image pick-up means.

2. A camera having excitable image pick-up means to output image signals, and setting means for controlling said pick-up means, said setting means having a first setting mode for bringing said image pick-up means into a non-excited state, a second setting mode for bringing said image pick-up means into a first excited state, wherein said setting means has means for detecting a condition in which a grip of the camera is held and bringing about said second setting mode, and a third setting mode for bringing said image pick-up means into a second excited state and making it possible to output said image signals from said image pick-up means.

3. A camera having excitable image pick-up means to output image signals, and setting means for controlling said pick-up means, said setting means having a first setting mode for bringing said image pick-up means into a non-excited state, a second setting mode for bringing said image pick-up means into a first excited state, wherein said setting means has means for detecting that a tripod has been set on the camera and bringing about said second setting mode, and a third setting mode for bringing said image pick-up means into a second excited state and making it possible to output said image signals from said image pick-up means.

4. A camera having excitable image pick-up means to output image signals, and setting means for controlling said pick-up means, said setting means having a first setting mode for bringing said image pick-up means into a non-excited state, a second setting mode for bringing said image pick-up means into a first excited state, wherein said setting means has means responsive to a monitor stage or a two-stage trigger button to bring about said second setting mode, and a third setting mode for bringing said image pick-up means into a second excited state and making it possible to output said image signals from said image pick-up means.

5. A camera according to claim 1 or 2 or 3 or 4, wherein said image pick-up means comprises an image pick-up tube, and means for heating said tube at said second setting mode.

6. A camera comprising excitable image pick-up means to output image signals, and setting means having a first setting mode for bringing said image pick-up means into a non-excited state, a second setting mode for bringing said image pick-up means into a first excited state, and a third setting mode for bringing said image pick-up means into a second excited state and making it possible to output said image signals from said image pick-up means, recording means for recording said image signal, and generating means for generating a signal which prevents said recording means from recording, wherein said generating means generates said signal when said image pick-up means is brought onto a non-excited state even if said setting means has the third setting mode.

7. A camera comprising:
excitable image pick-up means to output image signals,
setting means having a first setting mode for bringing said image pick-up means into a non-excited state, a second setting mode for bringing said image pick-up means into a first excited state, and a third setting mode for bringing said image pick-up means into a second excited state and making it possible to output said image signals from said image pick-up means,
image pick-up discriminating means for discriminating the operative condition of said image pick-up means, and
means responsive to said third setting mode of said setting means and a discrimination output of said image pick-up discriminating means to produce an image recording start signal.

8. A camera according to claim 7, further having annunciating means operable in response to an output of said image pick-up discriminating means.

9. A camera according to claim 7, wherein said image pick-up discriminating means has a timer for measuring a lapse of time after setting of said second mode of said setting means.

10. A camera according to claim 7, wherein said image pick-up discriminating means has means for determining an output level of the picture signal of said image pick-up means.

11. A camera according to claim 7, wherein said image pick-up means comprises an image pick-up tube, and heating means for heating said tube.

12. A camera according to claim 11, wherein said image pick-up discriminating means discriminates that said image pick-up tube has been heated to be operable by said heating means.

13. A camera according to claim 12, wherein said image pick-up discriminating means comprises detecting means for detecting the temperature condition of said image pick-up tube.

14. A camera comprising:
excitable image pick-up means to output image signals, setting means having a first setting mode for bringing said image pick-up means into a non-excited state and a second setting mode for bringing said image pick-up means into a first excited state,
trigger means for bringing said image pick-up means into a second excited state and making it possible to output said image signals from said image pick-up means, image pick-up discriminating means for discriminating the operative condition of said image pick-up means,
signal output means responsive to said second setting mode of said setting means and said trigger means to generate a signal, and means responsive to said signal output means and said image pick-up discriminating means to produce an image recording start signal.

15. A camera according to claim 14, further having annunciating means operable in response to an output of said image pick-up discriminating means.

16. A camera according to claim 14, wherein said image pick-up discriminating means has a timer for measuring a lapse of time after setting of said second mode of said setting means.

17. A camera according to claim 14, wherein said image pick-up discriminating means has means for determining an output level of the picture signal of said image pick-up means.

18. A system having image pick-up means for taking out image signals, setting means having a first setting mode for bringing said image pick-up means into a non-excited state, a second setting mode for bringing said image pick-up means into a first excited state, and a third setting mode for bringing said image pick-up means into a second excited state and making it possible to take out said image signals from said image pick-up means, image pick-up discriminating means for discriminating the operative condition of said image pick-up means, means responsive to said third setting mode of said setting means and a discrimination output of said image pick-up discriminating means to produce an image recording start signal, and image recording means for starting image recording by said image recording start signal.

19. A camera according to claim 18, wherein said image pick-up means is an image pick-up tube.

20. A camera according to claim 19, further comprising heating means for heating cathodes of said image pick-up tube at said second setting mode and said discriminating means detects that said cathodes have been sufficiently heated by said heating means to produce an image recording start signal.

21. A camera according to claim 18 or 19 or 20, wherein said image recording means effects recording of said image signals on a tape.

22. A camera according to claim 21, wherein said tape is a magnetic tape.

23. A camera video tape recording system having image pick-up means for taking out image signals, setting means having a first setting mode for bringing said image pick-up means into a non-excited state and a second setting mode for bringing said image pick-up means into a first excited state, trigger means for bringing said image pick-up means into a second excited state and making it posible to take out said image signals from said image pick-up means, image pick-up discriminating means for discriminating an operative condition of said image pick-up means, signal output means responsive to said second setting mode of said setting means and said trigger means to produce a signal, start signal output means responsive to said signal output means and said image pick-up discriminating means to produce an image recording start signal, and image recording means for effecting image recording by said image recording start signal.

24. A camera according to claim 23, wherein said image pick-up means is an image pick-up tube.

25. A camera according to claim 24, further comprising heating means for heating the cathodes of said image pick-up tube at said second setting mode and said discriminating means detects that said cathodes have been sufficiently heated to produce a signal.

* * * * *

UNITED STATES PATENT AND TRADEMARK OFFICE
CERTIFICATE OF CORRECTION

PATENT NO. : 4,368,490

DATED : January 11, 1983

INVENTOR(S) : HIROYUKI TAKIMOTO, et al.

It is certified that error appears in the above-identified patent and that said Letters Patent is hereby corrected as shown below:

Column 1, line 44, "mcuh" should read --much--.

Column 2, line 67, "temporally" should read --temporarily--.

Column 3, line 6, "where" should read --when--;
line 9, after "whereat" insert "the";
line 21, "is" should read --in--.

Column 5, line 47, "finder" should read --finders--.

Column 11, line 19, between "predetermined" and "has" insert --time--;
line 21, "low level" should read --a low level signal--
line 22, "high level" should read --a high level signal--;
line 25, before "low" insert --a--;
line 26, after "level" (first occurrence) insert --signal--.

UNITED STATES PATENT AND TRADEMARK OFFICE
CERTIFICATE OF CORRECTION

PATENT NO. : 4,368,490

DATED : January 11, 1983

INVENTOR(S) : HIROYUKI TAKIMOTO, et al.

It is certified that error appears in the above-identified patent and that said Letters Patent is hereby corrected as shown below:

Column 12, line 26, after "trigger" insert a closed parenthesis;
line 59, "be" should read --by--.

Column 13, line 27, "finder" should read --finders--;
line 50, after "that" insert --the--.

Column 14, line 31, after "effects" insert --the--.

Column 15, line 13, "provide" should read --provides--;
line 13, after "of" insert --the--;
line 21, "transistr" should read --transistor--;
line 47, "other" should read --another--;
line 54, "becomes" should read --become--.

Column 16, line 20, after "meaning" delete --the--.

Signed and Sealed this

Seventeenth Day of July 1984

[SEAL]

Attest:

GERALD J. MOSSINGHOFF

Attesting Officer

Commissioner of Patents and Trademarks